A. B. McCULLOUGH.
AUTOMOBILE JACK.
APPLICATION FILED NOV. 18, 1914.
1,145,693.
Patented July 6, 1915.
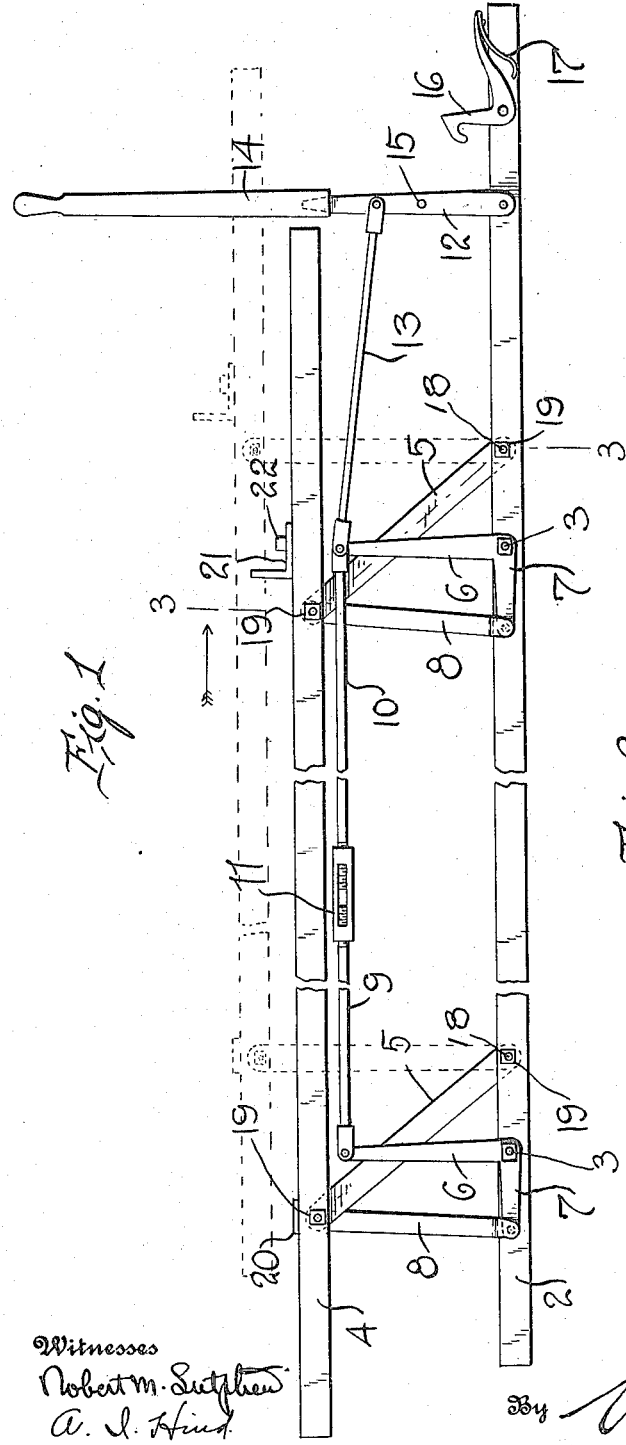
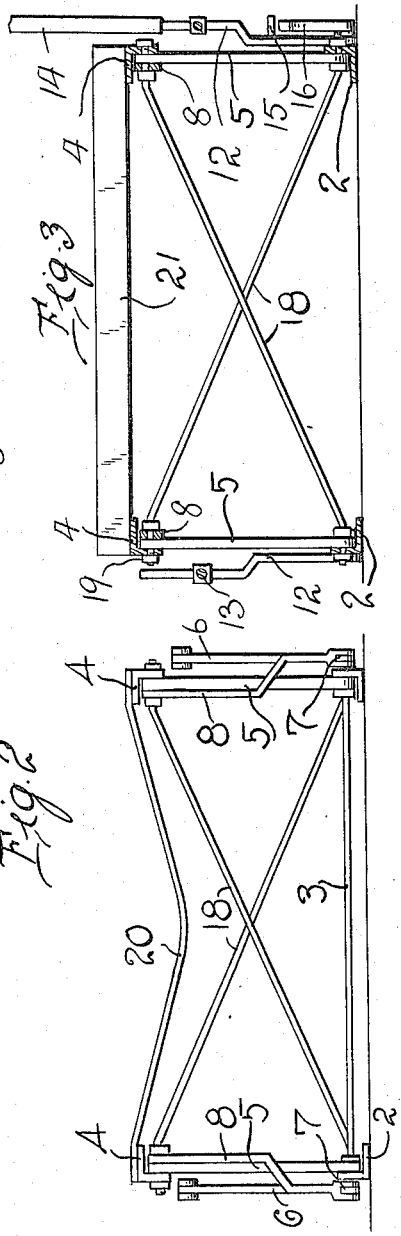
Inventor
A. B. McCULLOUGH
Witnesses
Robert M. Sutphen
A. J. Hind
By Watson E. Coleman
Attorney

UNITED STATES PATENT OFFICE.

ARTHUR B. McCULLOUGH, OF CORUNNA, INDIANA.

AUTOMOBILE-JACK.

1,145,693. Specification of Letters Patent. Patented July 6, 1915.

Application filed November 18, 1914. Serial No. 872,774.

*To all whom it may concern:*

Be it known that I, ARTHUR B. McCULLOUGH, a citizen of the United States, residing at Corunna, in the county of Dekalb and State of Indiana, have invented certain new and useful Improvements in Automobile-Jacks, of which the following is a specification, reference being had to the accompanying drawings.

My invention relates to devices for raising or lowering vehicles, and particularly to means for bodily raising or lowering automobiles.

The primary object of my invention is the provision of a very simple and effective mechanism whereby both the front and rear of the automobile may be simultaneously raised, so as to take all pressure off the wheels, and so as to permit the engine to be run and permit all parts of the mechanism, such as the differential, transmission, etc. to be examined.

A further object is to provide a mechanism of this character which shall be very simple in construction and very light so that it may be easily shifted to any portion of a garage, and wherein the lifting of the car is accomplished by means of a hand lever.

A further object is to so construct the lifting mechanism that the car will be locked in its lifted position.

Further objects will appear in the course of the following description.

My invention is illustrated in the accompanying drawings, wherein—

Figure 1 is a side elevation of my improved automobile jack in lowered position; Fig. 2 is an elevation thereof; Fig. 3 is a section on the line 3—3 of Fig. 1.

Corresponding and like parts are referred to in the following description and designated in all parts of the accompanying drawings by like reference numerals.

Referring to these drawings, it will be seen that my automobile jack comprises the oppositely disposed parallel angle irons 2 which are connected to each other so as to form a base frame, the horizontal flanges of the angle iron extending inward. These angle irons are connected at intervals by transverse rods 3 attached to the angle irons in any suitable manner. Disposed above the angle irons 2 forming the base frame are the angle irons 4 which form part of the vehicle supporting frame. These angle irons 4 may be connected to each other at intervals by transverse braces, and are also connected to the lower angle irons by cross braces, as will be later stated. Pivotally mounted upon the upright flanges of the lower angle irons 2 are longitudinally adjustable arms 5. These arms 5 at their upper ends are pivotally connected to the downwardly extending flanges of the angle irons 4. These arms 5 are arranged in pairs at each end of the mechanism, the arms being arranged on each side of the device. The arms 5 when lowered are disposed in an oblique position but when raised are disposed vertically. Also pivotally mounted upon the upwardly extending flanges of each of the angle irons 2, at opposite ends of these angle irons are the bell crank levers 6, the short arms 7 of which are connected by means of the links 8 to the ends of the arms 5 and the long arms of these bell crank levers, normally, that is, when the upper frame is raised, extend vertically upward. These vertical arms 6 of the bell crank levers on each side are connected to each other by means of longitudinal rod sections being connected to each other by means of turn buckles 11. It will of course be understood that these rods 9 and 10 are pivotally connected to the upper ends of the arms 6. At one end of the base frame are provided the actuating levers 12, and there are two of these levers, one for each of the angle irons 2 and each pivoted at its lower end to its corresponding angle iron. Each lever is connected to the bell crank lever on that side by means of a rod 13 which is operatively connected to the extremity of the bell crank lever. It will thus be seen that by operating the levers 12 in one direction the arms 5 will be raised to a vertical position, and that by shifting the levers 12 in the other direction the arms will be lowered, thus in one case raising the upper frame which supports the car and in the other case lowering the frame. Preferably one of the levers 12 is tapered or otherwise formed so as to fit into a socket formed in the handle 14, this handle being detachable. These levers 12 it will be noted do not extend above the angle irons 4 when these angle irons are in their lowered positions, and thus do not obstruct the passage of the car over the frame if the handle 14 be detached from the lever. One or both of the levers is provided with a stud 15 and mounted upon one or both of the angle irons 2 at the extremities thereof is a latch 16 adapted to engage over the corresponding lug. The tail of this latch is extended horizontally so that the latch may be readily operated by the foot, and a spring 17 is disposed to raise the tail end of the latch. When the levers 12 are shifted so as to raise the car supporting frame to its full height, the lug or lugs 15 will engage with the latch or latches 16 and thus the car will be held raised.

In order to brace the upper angle irons 4 and also the lower angle irons, I preferably provide the cross braces 18. These braces extend across each other and are disposed in the plane of the arms 5. The upper and lower ends of each of the braces are angled somewhat, and these angled ends extend through the flange of the angle iron 2 and through the flange of the angle iron 4. These angular ends also extend through the meeting ends of the arm 5 and the link 8, and the angular lower terminals of these rods extend through the pivotal centers of the arms 5. Nuts 19 are disposed on these angular ends of the rods 18, these nuts bearing against the downwardly extending flange of the angle irons and against the link 8. A clip 20 is also used in connection with the jack, this clip extending over and resting on the space between the upper angle irons 4 and engaging over these irons, and this clip is adapted to be used with cars having a truss rod under the rear axle to support the differential.

The operation of my invention will be obvious from what has gone before. With the upper bars or rails lowered the car is run over the jack, the jack being narrower than the width between the wheels, and when the car is in proper position the lever 12 is operated by means of the handle or extension 14 so as to lift the upper rails or bars. These engage beneath the axles of the car to lift the car bodily upward with the wheels off the floor. At this time the levers 12 have been shifted to a horizontal position and engage with the latch 16, and as a consequence the arms 5 have been lifted to a vertical position as have the brace rods 18. The upper rails or bars are thus firmly supported from the lower rails forming the base of the frame. The bell crank levers at this time are so disposed that their arms 6 are nearly horizontal. A stop 21 or a pair of stops are adapted to be applied to one or both of the upper rails or bars, each stop being angular in form and being held to the horizontal flange of the angle irons by bolts 22, or in any other suitable manner. These limit the outward movement of the car and keep it in proper position. If there is any slack in the lifting rods 9 and 10 this slack may be taken up by adjusting the turn buckle 11.

It will be obvious that with a construction of this character a simple downward movement of the hand lever will instantly raise all four of the wheels of the car clear of the floor, thus relieving the tires of the dead weight of the car when not in use and allowing the running of the engine with no clutch thrown in and thus permits an examination to be made of the car for differential and transmission trouble, and also allows the steering gear and brakes to be tested and an examination made of the four wheels for alinement.

While I have described the upper and lower rails as being composed of angle iron, I wish it to be distinctly understood that I do not wish to be limited to this form for the purpose. Channel iron might be used, or tubular iron might be used under some circumstances. Nor do I wish to be limited to the detail construction which I have illustrated in the drawings and set forth in the accompanying specification.

Having described my invention, what I claim is:

A mechanism for lifting vehicles including a base frame, an axle engaging frame disposed above the base frame, bell crank levers pivoted upon the base frame, arms also pivoted upon the base frame, links having their lower ends pivotally connected with the bell crank levers, the upper ends of the arms and the upper ends of the links being pivotally connected with the frame, the upper ends of the arms and links having the same point of pivotal connection, and means for raising the axle engaging frame.

In testimony whereof I hereunto affix my signature in the presence of two witnesses.

ARTHUR B. McCULLOUGH.

Witnesses:
J. HARVEY KNAUER,
MILO J. THOMAS.